US011987868B2

(12) United States Patent
Luo et al.

(10) Patent No.: US 11,987,868 B2
(45) Date of Patent: May 21, 2024

(54) PREPARATION METHOD OF A RARE EARTH ANISOTROPIC BONDED MAGNETIC POWDER

(71) Applicants: GRIREM ADVANCED MATERIALS CO., LTD., Beijing (CN); GRIREM HI-TECH CO., LTD., Langfang (CN)

(72) Inventors: Yang Luo, Beijing (CN); Zilong Wang, Beijing (CN); Yuanfei Yang, Beijing (CN); Zhou Hu, Beijing (CN); Dunbo Yu, Beijing (CN); Jiajun Xie, Beijing (CN); Yifan Liao, Beijing (CN); Zhongkai Wang, Beijing (CN)

(73) Assignees: GRIREM ADVANCED MATERIALS CO., LTD., Beijing (CN); GRIREM HI-TECH CO., LTD., Langfang (CN)

( * ) Notice: Subject to any disclaimer, the term of this patent is extended or adjusted under 35 U.S.C. 154(b) by 68 days.

(21) Appl. No.: 17/090,703

(22) Filed: Nov. 5, 2020

(65) Prior Publication Data

US 2021/0129217 A1 May 6, 2021

(30) Foreign Application Priority Data

Nov. 6, 2019 (CN) ........................ 201911076252.1

(51) Int. Cl.
*B22F 1/142* (2022.01)
*B22F 9/04* (2006.01)
(Continued)

(52) U.S. Cl.
CPC ............ *C22C 38/005* (2013.01); *B22F 1/142* (2022.01); *B22F 9/04* (2013.01); *C22C 1/1084* (2013.01); *H01F 1/0576* (2013.01); *B22F 2009/041* (2013.01); *B22F 2201/013* (2013.01); *B22F 2201/20* (2013.01); *B22F 2301/355* (2013.01); *C22C 2202/02* (2013.01)

(58) Field of Classification Search
CPC ............................ B22F 9/04; B22F 2009/041; B22F 2201/013; B22F 2201/20; B22F 2301/355; C22C 2202/02; H01F 1/0573; H01F 41/0293
See application file for complete search history.

(56) References Cited

U.S. PATENT DOCUMENTS

| | | | | |
|---|---|---|---|---|
| 2005/0067052 A1* | 3/2005 | Honkura | C22C 38/10 | 148/105 |
| 2006/0048855 A1* | 3/2006 | Honkura | H01F 41/0293 | 148/105 |

(Continued)

FOREIGN PATENT DOCUMENTS

| | | |
|---|---|---|
| CN | 104882266 A | 9/2015 |
| KR | 100452787 B1 | 10/2004 |

*Primary Examiner* — Nicholas A Wang
*Assistant Examiner* — Maxwell Xavier Duffy
(74) *Attorney, Agent, or Firm* — Westbridge IP LLC

(57) ABSTRACT

A method for preparing a rare earth anisotropic bonded magnetic powder, comprises the following steps: (1) preparing raw powder with RTBH as the main component, wherein, R is Nd or Pr/Nd, and T is a transition metal containing Fe; (2) adding La hydride or Ce hydride and copper powder to the raw powder to form a mixture; (3) subjecting the mixture to atmosphere diffusion heat treatment to give the rare earth anisotropic bonded magnetic powder.

16 Claims, 2 Drawing Sheets

(51) Int. Cl.
*C22C 1/10* (2023.01)
*C22C 38/00* (2006.01)
*H01F 1/057* (2006.01)

(56) References Cited

U.S. PATENT DOCUMENTS

| | | | | |
|---|---|---|---|---|
| 2009/0032147 | A1* | 2/2009 | Nozawa | H01F 1/0577<br>419/23 |
| 2013/0009736 | A1 | 1/2013 | Honkura et al. | |
| 2013/0068992 | A1* | 3/2013 | Hono | C22C 38/005<br>252/62.55 |

* cited by examiner

PREPARATION METHOD OF A RARE EARTH ANISOTROPIC BONDED MAGNETIC POWDER

CROSS-REFERENCE TO RELATED APPLICATION

This application claims priority from CN201911076252.1 filed Nov. 6, 2019, the contents of which are incorporated herein in the entirety by reference.

TECHNICAL FIELD OF THE INVENTION

The invention relates to the field of magnetic materials, in particular to a preparation method of a rare earth anisotropic bonded magnetic powder.

BACKGROUND OF THE INVENTION

The magnetic powder used for bonded neodymium-iron-boron permanent magnet materials is mainly divided into two categories: isotropic and anisotropic magnetic powder. At present, the isotropic neodymium-iron-boron magnetic powder is prepared by the rapid melt quenching method, with the maximum magnetic energy product being 12-16 MGOe, and the thus prepared isotropic NdFeB bonded magnet has a maximum magnetic energy product not exceeding 12 MGOe. In contrast, the anisotropic neodymium-iron-boron bonded magnetic powder is usually prepared by the HDDR (hydrogenation-disproportionation-dehydrogenation-recombination) method. Owning to the particularity of the microstructure, that is, the parallel arrangement of fine grains (200-500 nm) in the direction of [001] easy magnetization axis, makes the maximum magnetic energy product 2-3 times that of the isotropic bonded magnetic powder. Through the molding or injection molding process, high-performance anisotropic bonded magnets can be prepared, which is in line with the development trend of miniaturization, lightweight and precision of electrical devices. Therefore, the market demand for high-performance anisotropic magnetic powder is becoming more and more urgent.

However, the bonded neodymium-iron-boron magnet prepared from HDDR magnetic powder has the problem of insufficient heat resistance. For example, in applications exposed to high temperatures such as automobiles, if the magnet has low heat resistance, the possibility of irreversible demagnetization is high. Therefore, as far as HDDR magnetic powder is concerned, it is necessary to fully improve its heat resistance so as to make it useful in fields including automobiles and the like, thereby expanding its application range.

To improve the heat resistance of the anisotropic magnetic powder, that is, to reduce the possibility of demagnetization at a high temperature, is to increase the coercivity of the magnetic powder at a high temperature. There are two main approaches: the first is to increase the coercivity of the anisotropic magnetic powder itself (room-temperature coercivity), so that the high-temperature coercivity is also improved accordingly without changing the temperature coefficient; and the second is to increase the temperature coefficient of the anisotropic magnetic powder, so that the high-temperature coercivity is also improved accordingly without changing the room-temperature coercivity.

At present, the first approach gets a lot of attention, namely, improving the heat resistance by increasing the coercivity of the anisotropic magnetic powder itself. There are two main methods to improve the coercivity of the magnetic powder itself: one is the direct addition of medium and heavy rare earth elements such as Tb and Dy, and the other is the addition of medium and heavy rare earth elements or low melting point alloy elements through grain boundary diffusion. The former, owning to the addition of heavy rare earths, will undoubtedly lead to a substantial increase in production costs, which not only consumes scarce strategic heavy rare earth resources and greatly increases production costs, but also reduces the remanence and magnetic energy product of the magnet owning to the antiferromagnetic coupling between Tb, Dy and Fe atoms; and the latter, owning to the inclusion of the grain boundary diffusion process, requires additional steps such as preparing the diffusion source, mixing the powder, and diffusing heat treatment, which makes the production process more complicated and also increases the processing cost.

For example, CN107424694A discloses a method of preparing a high-coercivity anisotropic magnetic powder, comprising the steps of mixing the diffusion raw materials including at least Nd and Cu supply sources and the anisotropic magnet raw material, and then carrying out the diffusion process. However, the production process is complicated and the processing cost is high; moreover, CN107424694A does not describe high-abundance rare earth elements La and Ce. In CN1345073A, the medium and heavy rare earth elements (one or more of Dy, Tb, Nd, Pr) enter the grain boundary phase through the grain boundary diffusion, which significantly improves the coercivity and also greatly increases the production cost.

Therefore, it has become a current research hotspot to develop a high-coercivity rare earth anisotropic bonded magnetic powder free of heavy rare earth.

SUMMARY OF THE INVENTION

I. Objectives of the Invention

The objective of the invention is to provide a preparation method of a rare earth anisotropic bonded magnetic powder, which can not only increase the coercivity of rare earth anisotropic bonded magnetic powder but also reduce production costs.

II. Technical Solutions

To solve the above problem(s), the invention provides a preparation method of a rare earth anisotropic bonded magnetic powder, comprising the following steps:

(1) Preparing a raw powder with RTBH as the main component; wherein R is Nd or Pr/Nd, and T is a transition metal containing Fe;

(2) Adding La/Ce hydride and copper powder to the raw powder to make a mixture;

(3) Subjecting the mixture to diffusion heat treatment to give the rare earth anisotropic bonded magnetic powder.

Neodymium-iron-boron is composed of the main phase $Nd_2Fe_{14}B$ and the grain boundary phase. For bonded neodymium-iron-boron magnetic powder, the content of the grain boundary phase and the degree of non-magnetism directly affect the coercivity.

In the invention, the anisotropic neodymium-iron-boron magnetic powder is mixed with La/Ce hydride and copper powder and then subjected to grain boundary diffusion, so that La and Ce high-abundance rare earth elements and copper element enter the grain boundary phase, which not only increases the width of the boundary phase but also effectively reduces the magnetism of the grain boundary phase and enhances the decoupling effect, thereby increasing the coercivity of the magnetic powder.

It can be seen that the invention can still effectively increase the coercivity of the anisotropic magnetic powder by using high-abundance rare earth La/Ce rather than medium and heavy rare earth Dy/Tb/Pr/Nd, thereby improving the heat resistance.

III. Beneficial Effects

The above technical solutions of the invention have the following beneficial technical effects: the selected La and Ce high-abundance rare earth elements have high reserves and low prices, and they can achieve the same coercivity-enhancing effect and significantly reduce the cost at the same time, thereby realizing efficient application of low-cost and high-abundance rare earths, as compared with the addition of Dy, Tb, Nd, Pr and other medium and heavy rare earth elements.

DETAILED DESCRIPTION OF THE EMBODIMENTS

Figure 1:
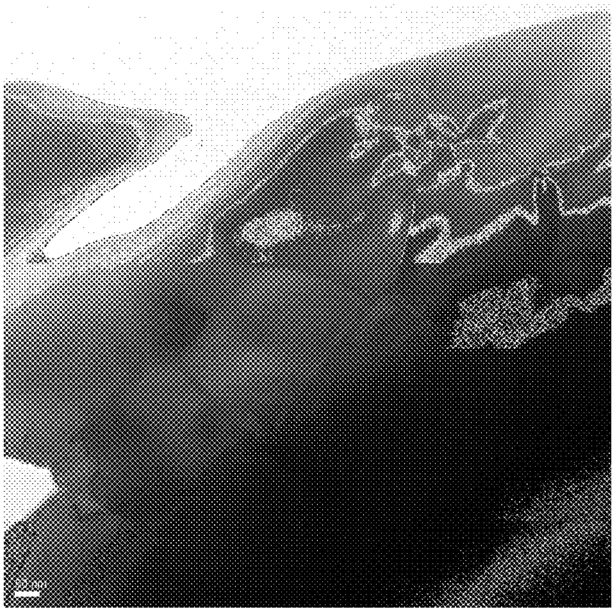
FIG. 1 is a low-magnification structure chart of the raw powder with RTBH as the main component obtained in Example 1.

In order to make the objectives, technical solutions, and advantages of the present invention clearer, the invention is further illustrated in detail below in conjunction with specific embodiments and with reference to the accompanying drawings. It should be understood that these descriptions are only exemplary and are not intended to limit the scope of the invention. In addition, in the following section, descriptions of well-known structures and technologies are omitted to avoid unnecessarily obscuring the concept of the present invention.

The invention provides a preparation method of a rare earth anisotropic bonded magnetic powder, comprising the following steps:

(1) Preparing a raw powder with RTBH as the main component; wherein R is Nd or Pr/Nd, and T is a transition metal containing Fe;

(2) Adding La/Ce hydride and copper powder to the raw powder to make a mixture;

(3) Subjecting the mixture to atmosphere diffusion heat treatment to give the rare earth anisotropic bonded magnetic powder.

In the invention, the raw powder with RTBH as the main component is prepared by the HDDR method, which may include the following steps:

a. Hydrogen absorption and disproportionation stage: putting the RTBH alloy in a rotating gas-solid reaction furnace, heating up to 760-860° C. under a hydrogen pressure of 0-0.1 MPa, and then maintaining the hydrogen pressure at 20-100 kPa for 1 h-4 h to complete the treatment of hydrogen absorption and disproportionation stage;

b. Slow dehydrogenation and repolymerization stage: after the completion of the hydrogen absorption and disproportionation stage, keeping the temperature in the furnace at 800-900° C., adjusting the hydrogen pressure in the furnace to 1-10 kPa, and keeping the pressure for 10-60 minutes to complete the treatment of slow dehydrogenation and repolymerization stage;

c. Complete dehydrogenation stage: after the completion of the slow dehydrogenation and repolymerization stage, quickly vacuum-pumping to a hydrogen pressure below 1 Pa to complete the complete dehydrogenation stage;

d. Cooling stage: after the completion of the complete dehydrogenation stage, cooling down to room temperature to give the raw powder with RTBH as the main component.

In step (1) of the invention, based on the weight of the raw powder, the content of R is 28.9 wt %, and the grain boundary phase can be evenly distributed along the grain boundary and surround the main phase grains, so that adjacent grains are magnetically separated, which can effectively play a role in demagnetization exchange coupling. Preferably, the content of R is 26.68-28.9 wt %, for example, the content of R may be 28.9 wt %, 28.5 wt %, 28.0 wt %, 27.5 wt %, 27 wt %, 26.68 wt %, and any numerical value in the range defined by any two numerical values among these point values.

In step (1) of the invention, the raw powder has an average particle size D50 of 80-120 μm.

In the invention, La/Ce hydride is used as the grain boundary diffusion elements. During the heat treatment in step (3), La/Ce elements will enter the grain boundary phase.

In step (2) of the invention, based on the weight of the raw powder, the La/Ce hydride is added at a ratio not higher than 5 wt %, preferably 0.5-5 wt %, for example, the ratio may be 0.5 wt %, 1.0 wt %, 1.5 wt %, 2.0 wt %, 2.5 wt %, 3.0 wt %, 3.5 wt %, 4.0 wt %, 4.5 wt %, 5.0 wt %, and any numerical value in the range defined by any two numerical values among these point values.

In the invention, the copper powder is mainly used to lower the melting point of the La/Ce hydride, thereby effectively reducing the temperature that is required to melt the grain boundary phase during the heat treatment process.

In step (2) of the invention, the copper powder is added at a ratio of 25-100 wt %, based on the weight of the La/Ce hydride.

In step (2) of the invention, the copper powder has an average particle size D50 of less than 10 μm, which is beneficial to the better diffusion of the copper powder into the grain boundary phase.

In the invention, during the atmosphere diffusion heat treatment process, the grain boundary phase that has been melted into liquid is the diffusion channel, which is beneficial to the diffusion of La and Ce high-abundance rare earth elements and copper element from the surface of the raw powder with RTBH as the main component to the inside of the raw powder and then entry into the grain boundary phase. The above process increases the width of the grain boundary phase, and also effectively reduces the magnetism of the grain boundary phase and enhances the decoupling effect, thereby increasing the coercivity of the raw powder with RTBH as the main component.

In step (3) of the invention, in a preferred embodiment, the atmosphere diffusion heat treatment includes hydrogen-containing atmosphere heat treatment or vacuum heat treatment.

Preferably, the hydrogen-containing atmosphere heat treatment is carried out under conditions including: hydrogen pressure ≤1 kPa, annealing temperature of 700-900° C., and annealing time of 20-180 min.

Preferably, the vacuum heat treatment is carried out under conditions including: vacuum degree ≤5 Pa, annealing temperature of 700-900° C., annealing time of 20-180 min.

In step (3) of the invention, the rare earth anisotropic bonded magnetic powder has an average particle size D50 of 80-120 μm.

In step (3) of the invention, the crystal grains of the rare earth anisotropic bonded magnetic powder include grain boundary phase and $R_2T_{14}B$ magnetic phase.

Preferably, in the rare earth anisotropic bonded magnetic powder, the ratio of the La/Ce content in the grain boundary phase to the La/Ce content in the $R_2T_{14}B$ magnetic phase is greater than 5. At this time, La/Ce elements are mainly concentrated in the grain boundary phase and the content in the $R_2T_{14}B$ magnetic phase is relatively low, which can effectively increase the width of the grain boundary phase, reduce the magnetism of the grain boundary phase, and increase the coercivity without causing significant reduction of remanence.

Preferably, in the rare earth anisotropic bonded magnetic powder, the ratio of the Cu content in the grain boundary phase to the Cu content in the $R_2T_{14}B$ magnetic phase is greater than 10. At this time, the Cu element is mainly concentrated in the grain boundary phase and the content in the $R_2T_{14}B$ in the magnetic phase is relatively low, which can effectively increase the width of the grain boundary phase, reduce the magnetism of the grain boundary phase, and increase the coercivity without causing significant reduction of remanence.

The invention will be described in detail below through the examples. In the following examples, The parameters of the particle size distribution are measured in a PSA-laser particle size analyzer;

The coercivity parameters are measured in a magnetic performance measuring instrument;

The maximum magnetic energy product is measured in a magnetic performance measuring instrument;

The remanence is measured in a magnetism measuring instrument.

Unless otherwise specified, the raw materials used are all commercially available products.

Example 1

Figure 2:
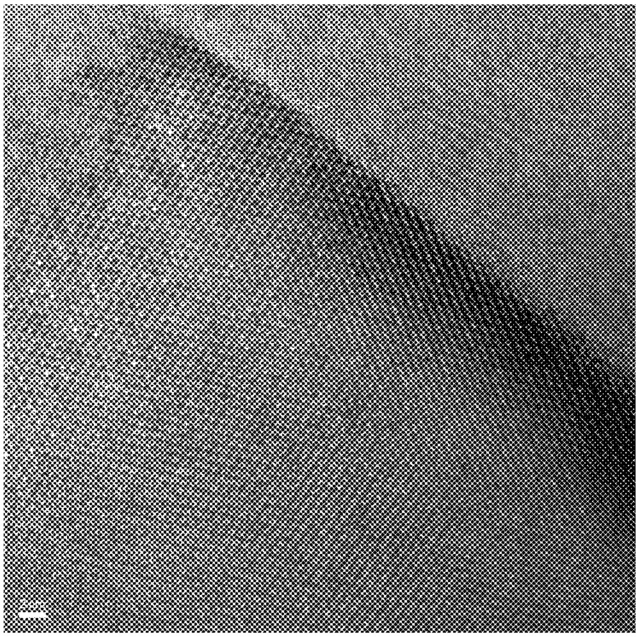
FIG. 2 is a high-magnification structure chart of the raw powder with RTBH as the main component obtained in Example 1.

The raw powder with NdFeBH as the main component was prepared by the HDDR method, comprising the following steps:

(1) Hydrogen absorption and disproportionation stage: the NdFeBH alloy was put in a rotating gas-solid reaction furnace, and heated up to 800° C. under a hydrogen pressure of 0.1 MPa, and then the hydrogen pressure was maintained at 50 kPa for 2 h to complete the treatment of hydrogen absorption and disproportionation stage;

(2) Slow dehydrogenation and repolymerization stage: after the completion of the hydrogen absorption and disproportionation stage, the temperature in the furnace was kept at 800° C. and the hydrogen pressure in the furnace was adjusted to 5 kPa; and then the temperature and pressure was maintained for 30 minutes to complete the treatment of slow dehydrogenation and repolymerization stage;

(3) Complete dehydrogenation stage: after the completion of the slow dehydrogenation and repolymerization stage, the furnace was quickly vacuum-pumped to a hydrogen pressure below 1 Pa to complete the complete dehydrogenation stage;

(4) Cooling stage: after the completion of the complete dehydrogenation stage, the furnace was cooled down to room temperature to give the raw powder with NdFeBH as the main component. The low-magnification structure chart and the high-magnification structure chart of the obtained raw powder are shown in FIG. 1 and FIG. 2, respectively. In FIG. 1, the main body is equiaxed $Nd_2Fe_{14}B$ crystal grains, and the white phase distributed between the crystal grains is the grain boundary phase. FIG. 2 is a high-resolution image taken by a transmission electron microscope, the two distinct areas in the figure are two adjacent $Nd_2Fe_{14}B$ crystal grains, and the adjacent area is the grain boundary phase with a thickness of 2 nm.

Example 2

The raw powder with PrNdFeBH as the main component was prepared by the HDDR method, comprising the following steps:

(1) Hydrogen absorption and disproportionation stage: the NdFeBH alloy was put in a rotating gas-solid reaction furnace, and heated up to 760° C. under a hydrogen pressure of 0.05 MPa, and then the hydrogen pressure was maintained at 30 kPa for 4 h to complete the treatment of hydrogen absorption and disproportionation stage;

(2) Slow dehydrogenation and repolymerization stage: after the completion of the hydrogen absorption and disproportionation stage, the temperature in the furnace was kept at 900° C. and the hydrogen pressure in the furnace was adjusted to 3 kPa; and then the temperature and pressure was maintained for 60 minutes to complete the treatment of slow dehydrogenation and repolymerization stage;

(3) Complete dehydrogenation stage: after the completion of the slow dehydrogenation and repolymerization stage, the furnace was quickly vacuum-pumped to a hydrogen pressure below 1 Pa to complete the complete dehydrogenation stage;

(4) Cooling stage: after the completion of the complete dehydrogenation stage, the furnace was cooled down to room temperature to give the raw powder with PrNdFeBH as the main component.

Example 3

A rare earth anisotropic bonded magnetic powder was prepared by a method comprising the following steps:

(1) To the raw powder obtained in Example 1 with NdFeBH as the main component, 0.5 wt % La/Ce hydride and 0.125 wt % copper powder were added to make a mixture;

(2) The mixture was subjected to hydrogen-containing atmosphere heat treatment to obtain the rare earth anisotropic bonded magnetic powder; wherein during the hydrogen-containing atmosphere heat treatment process, the hydrogen pressure was 0.6 kPa, the annealing temperature was 700° C., and the annealing time was 20 min.

Example 4

Figure 3:
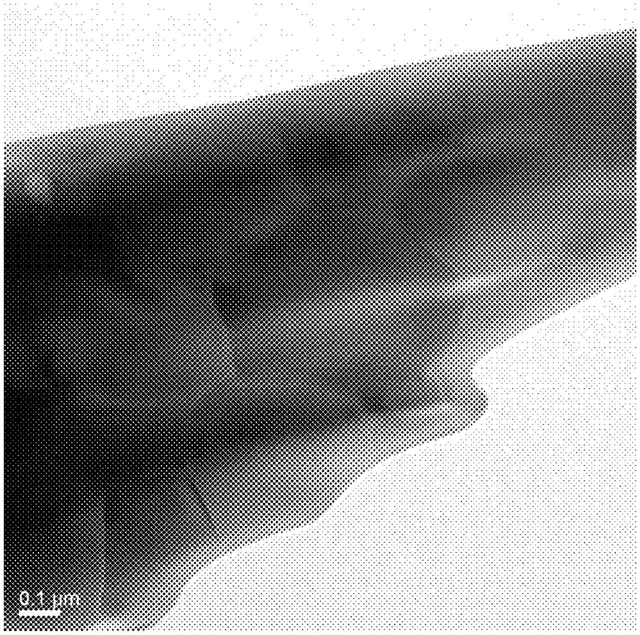
FIG. 3 is a low-magnification structure chart of the rare earth anisotropic bonded magnetic powder obtained in Example 4.
Figure 4:
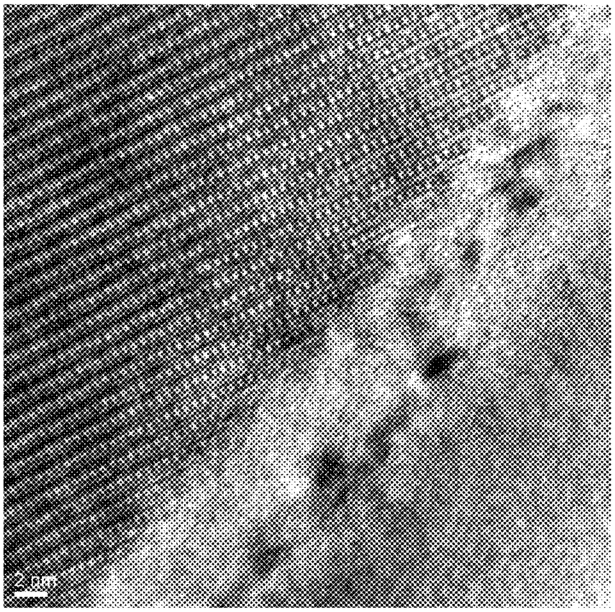
FIG. 4 is a high-magnification structure chart of the rare earth anisotropic bonded magnetic powder obtained in Example 4.

A rare earth anisotropic bonded magnetic powder was prepared by a method comprising the following steps:

(1) To the raw powder obtained in Example 2 with PrNdFeBH as the main component, 5.0 wt % La/Ce hydride and 1.25 wt % copper powder were added to make a mixture;

(2) The mixture was subjected to vacuum heat treatment to obtain the rare earth anisotropic bonded magnetic powder; wherein, during the vacuum heat treatment process, the vacuum degree was maintained at 5 Pa, the annealing temperature was 700° C., and the annealing time was 180 min. The low-magnification structure chart and the high-magnification structure chart of the obtained raw powder are shown in FIG. 3 and FIG. 4, respectively. In FIG. 3, the main body is equiaxed $Nd_2Fe_{14}B$ crystal grains, and the white phase distributed between the crystal grains is the grain boundary phase. FIG. 4 is a high-resolution image taken by a transmission electron microscope, the two distinct areas in the figure are two adjacent $Nd_2Fe_{14}B$ crystal grains, and the adjacent area is the grain boundary phase with a thickness of about 5 nm.

Example 5

A rare earth anisotropic bonded magnetic powder was prepared by a method comprising the following steps:

(1) To the raw powder obtained in Example 2 with NdFeBH as the main component, 3.0 wt % La/Ce hydride and 3.0 wt % copper powder were added to make a mixture;

(2) The mixture was subjected to hydrogen-containing atmosphere heat treatment to obtain the rare earth anisotropic bonded magnetic powder; wherein during the hydrogen-containing atmosphere heat treatment process, the hydrogen pressure was 0.5 kPa, the annealing temperature was 800° C., and the annealing time was 60 min.

Example 6

A rare earth anisotropic bonded magnetic powder was prepared according to the method of Example 4, except that 5 wt % La/Ce hydride and 1.25 wt % copper powder were added to make a mixture.

Example 7

A rare earth anisotropic bonded magnetic powder was prepared according to the method of Example 4, except that 5.0 wt % La/Ce hydride and 5.0 wt % copper powder were added to make a mixture.

Example 8

A rare earth anisotropic bonded magnetic powder was prepared according to the method of Example 4, except that 4.0 wt % La/Ce hydride and 2.0 wt % copper powder were added to make a mixture.

Comparative Example 1

A rare earth anisotropic bonded magnetic powder was prepared according to the method of Example 1 by using a rare earth alloy with identical chemical composition with the rare earth anisotropic bonded magnetic powder prepared in Example 3.

Comparative Example 2

A rare earth anisotropic bonded magnetic powder was prepared according to the method of Example 1 by using a rare earth alloy with identical chemical composition with the rare earth anisotropic bonded magnetic powder prepared in Example 4.

Comparative Example 3

A rare earth anisotropic bonded magnetic powder was prepared according to the method of Example 1 by using a rare earth alloy with identical chemical composition with the rare earth anisotropic bonded magnetic powder prepared in Example 5.

Test Example

The average particle size D50, coercivity, maximum magnetic energy product and remanence of the raw powders obtained in Examples 1-2 with RTBH as the main component were tested respectively. The test results are shown in Table 1. The average particle size D50, coercivity, maximum energy product and remanence of the rare earth anisotropic bonded magnetic powders obtained in Examples 3-8 and Comparative Examples 1-3 were tested respectively. The test results are shown in Table 1. The testing process required the orientation of the magnetic powder in a magnetic field, and the magnetic field for the orientation was not less than 30 kOe to ensure that the orientation was complete. At that time, the easy magnetization direction of the magnetic powder was arranged parallel along the direction of the external field.

TABLE 1

| Example No. | Average particle size D50 (μm) | Coercivity (kOe) | Maximum magnetic energy product (MGOe) | Remanence (kGs) |
|---|---|---|---|---|
| Example 1 | 80 | 13.0 | 39.5 | 13.0 |
| Example 2 | 80 | 13.1 | 39.0 | 12.9 |
| Example 3 | 80 | 13.5 | 38.3 | 12.8 |
| Example 4 | 80 | 15.0 | 36.7 | 12.5 |
| Example 5 | 80 | 14.5 | 37.3 | 12.6 |
| Example 6 | 80 | 14.6 | 37.9 | 12.7 |
| Example 7 | 80 | 15.8 | 36.0 | 12.4 |
| Example 8 | 80 | 14.5 | 37.0 | 12.6 |
| Comparative Example 1 | 80 | 13.0 | 35.7 | 12.3 |
| Comparative Example 2 | 80 | 13.5 | 34.7 | 12.1 |
| Comparative Example 3 | 80 | 13.2 | 35.3 | 12.2 |

From the results in Table 1, it can be seen that the Examples of the invention added La/Ce hydride and Cu powder on the basis of the raw powder of the anisotropic magnetic powder prepared by the HDDR method, and performed heat treatment, which effectively improved the coercivity of the magnetic powder without causing significant reduction of the remanence. Thus, the Examples of the invention obtained magnetic powders with high remanence, coercivity and maximum magnetic energy product. As compared with Comparative Examples 1-3, with the same chemical composition, the magnetic powders prepared by the methods of Examples 3-8 of the invention had higher magnetic performance, with significant effect.

In summary, the invention aims to protect a preparation method of a rare earth anisotropic bonded magnetic powder that can improve coercivity and reduce cost.

It should be understood that the foregoing specific embodiments of the invention are only used to exemplarily illustrate or explain the principle of the invention, and do not constitute a limitation to the invention. Therefore, any modifications, equivalent substitutions, improvements, and the like made without departing from the spirit and scope of the invention should be included in the protection scope of the invention. In addition, the appended claims of the invention are intended to cover all changes and modifications that fall within the scope and boundary of the appended claims, or equivalent forms of such scope and boundary.

What is claimed is:

1. A preparation method of a rare earth anisotropic bonded magnetic powder, wherein the method comprises:

(1) Preparing a raw powder with RTBH as a main component; wherein R is Nd or Pr/Nd, and T is any combination of transition metals and at least containing Fe;

(2) Adding La hydride or Ce hydride and copper powder to the raw powder to make a mixture; wherein the La hydride or Ce hydride is added at a ratio of higher than 3.5 wt % and lower than 5.0 wt %, based on a weight of the raw powder; and the copper powder is added at a ratio of 25-100 wt %, based on a weight of the La hydride or Ce hydride;

(3) Subjecting the mixture to atmosphere diffusion heat treatment to obtain the rare earth anisotropic bonded magnetic powder, the raw powder with RTBH as the main component is prepared by a HDDR method, which include the following steps:

a. Hydrogen absorption and disproportionation stage: putting an RTBH alloy in a rotating gas-solid reaction furnace, heating up to 760-860° C. under a hydrogen pressure of 0-0.1 MPa, and then maintaining the hydrogen pressure at 20-100 kPa for 1 h-4 h to complete the hydrogen absorption and disproportionation stage;

b. Slow dehydrogenation and repolymerization stage: after the completion of the hydrogen absorption and disproportionation stage, keeping the temperature in the furnace at 800-900° C., adjusting the hydrogen pressure in the furnace to 1-10 kPa, and maintaining the hydrogen pressure for 10-60 minutes to complete the slow dehydrogenation and repolymerization stage;

c. Complete dehydrogenation stage: after the completion of the slow dehydrogenation and repolymerization stage, vacuum-pumping to a hydrogen pressure below 1 Pa to complete the complete dehydrogenation stage;

d. Cooling stage: after the completion of the complete dehydrogenation stage, cooling down to room temperature to give the raw powder with RTBH as a main component.

2. The preparation method according to claim 1, wherein in step (1), the raw powder has an average particle size D50 of 80-120 μm.

3. The preparation method according to claim 1, wherein in step (1), a content of R is ≤28.9 wt %, based on a weight of the raw powder.

4. The preparation method of claim 1, wherein in step (2), the copper powder has an average particle size D50 of less than 10 μm.

5. The preparation method according to claim 1 in step (3), the atmosphere diffusion heat treatment includes a hydrogen-containing atmosphere heat treatment or a vacuum heat treatment.

6. The preparation method according to claim 5, wherein the hydrogen-containing atmosphere heat treatment is carried out under conditions including: a hydrogen pressure of ≤1 kPa, an annealing temperature of 700-900° C., and an annealing time of 20-180 min.

7. The preparation method according to claim 5, wherein the vacuum heat treatment is carried out under conditions including: vacuum degree ≤5 Pa, annealing temperature of 700-900° C., annealing time of 20-180 min.

8. The preparation method according to any one of claim 1 in step (3), the rare earth anisotropic bonded magnetic powder has an average particle size D50 of 80-120 μm.

9. The preparation method according to claim 1, wherein in step (3), crystal grains of the rare earth anisotropic bonded magnetic powder include a grain boundary phase and an $R_2T_{14}B$ magnetic phase.

10. The preparation method according to claim 9, wherein a ratio of a Cu content in the grain boundary phase to a Cu content in the $R_2T_{14}B$ magnetic phase is greater than 5.

11. The preparation method according to claim 9, wherein a ratio of a Cu content in the grain boundary phase to a Cu content in the $R_2T_{14}B$ magnetic phase is greater than 10.

12. The preparation method according to claim 2, wherein in step (3), the atmosphere diffusion heat treatment includes a hydrogen-containing atmosphere heat treatment.

13. The preparation method according to claim 3, wherein in step (3), the atmosphere diffusion heat treatment includes a hydrogen-containing atmosphere heat treatment.

14. The preparation method according to claim 4, wherein in step (3), the atmosphere diffusion heat treatment includes a hydrogen-containing atmosphere heat treatment.

15. The preparation method according to claim 2, wherein in step (3), crystal grains of the rare earth anisotropic bonded magnetic powder include a grain boundary phase and an $R_2T_{14}B$ magnetic phase.

16. The preparation method according to claim 3, wherein in step (3), crystal grains of the rare earth anisotropic bonded magnetic powder include a grain boundary phase and an $R_2T_{14}B$ magnetic phase.

* * * * *